No. 850,611. PATENTED APR. 16, 1907.
J. ABBOTT.
MACHINE FOR CUTTING OR SHEARING METAL SHEETS OR PLATES.
APPLICATION FILED MAY 10, 1904.
3 SHEETS—SHEET 1.
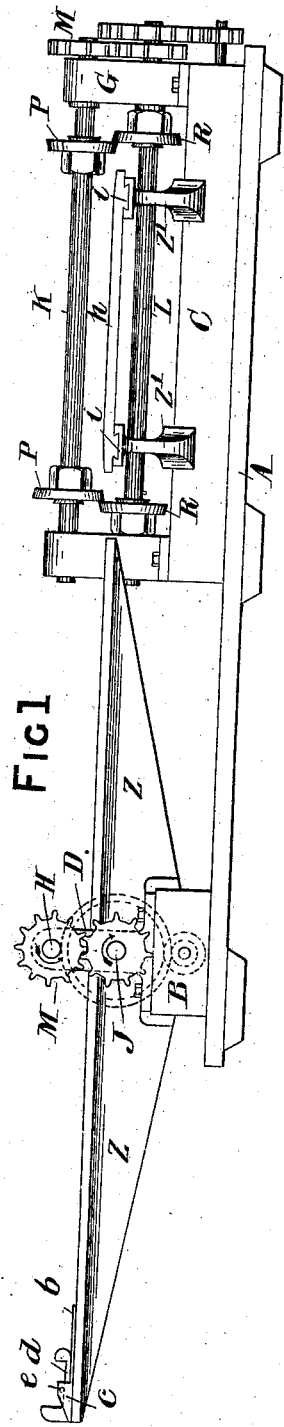
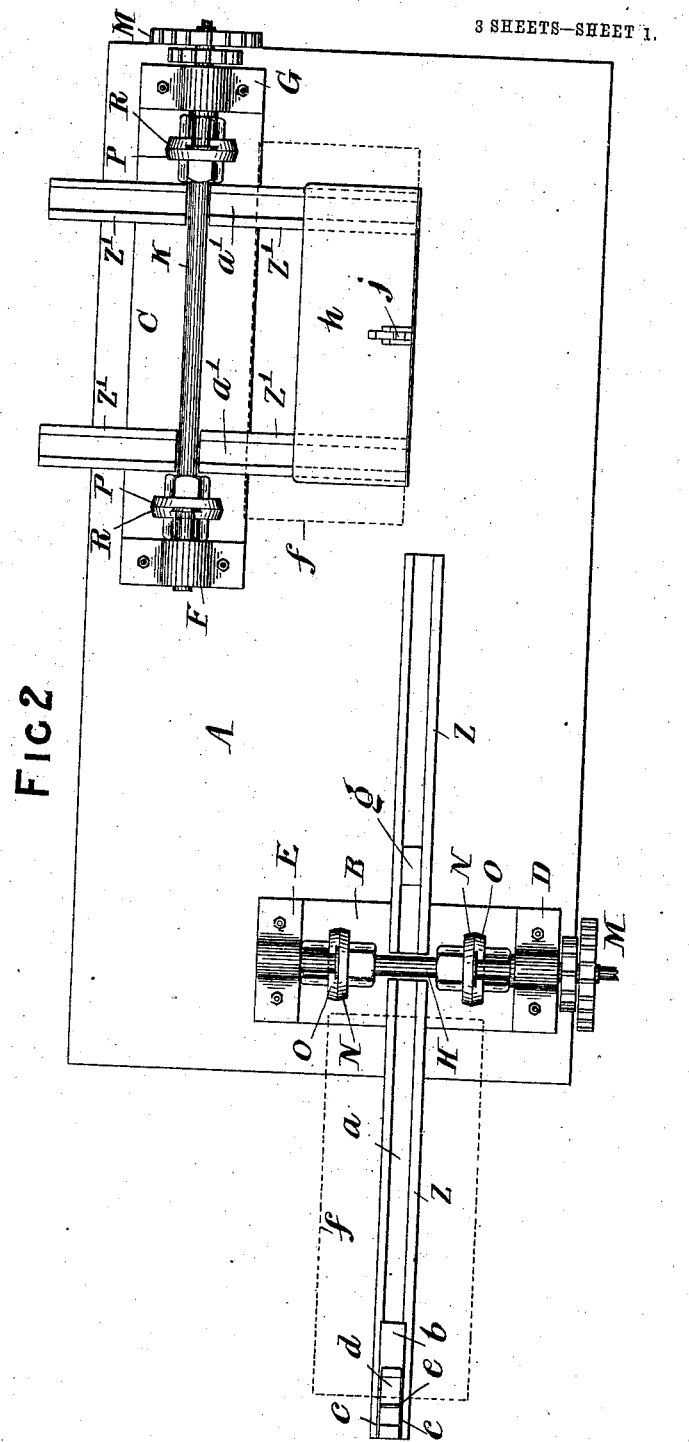
Witnesses
H. M. Kuehne
John A. Percival
Inventor
James Abbott
By Richard G.
ATTORNEYS No. 850,611. PATENTED APR. 16, 1907.
J. ABBOTT.
MACHINE FOR CUTTING OR SHEARING METAL SHEETS OR PLATES.
APPLICATION FILED MAY 10, 1904.
3 SHEETS—SHEET 2.
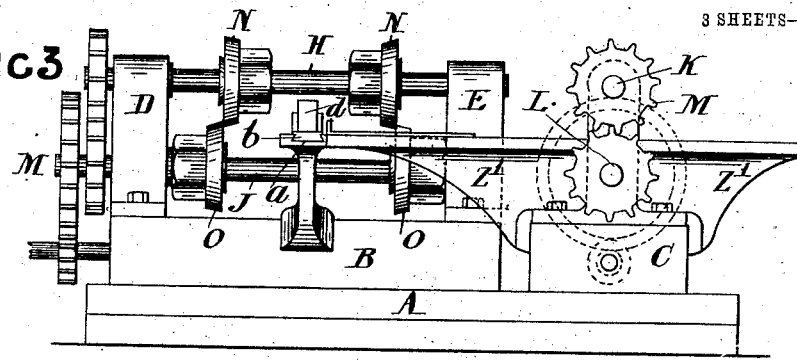
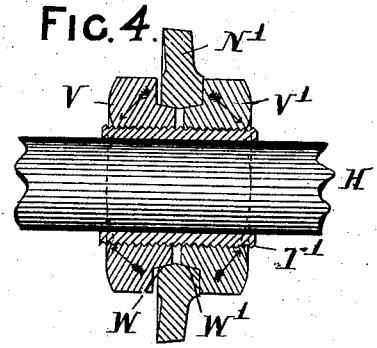
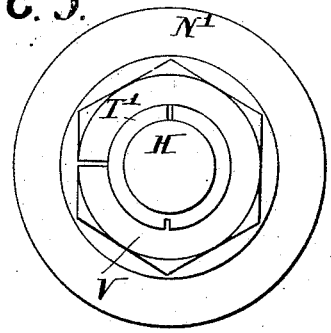
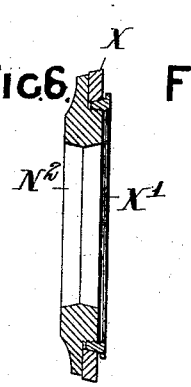
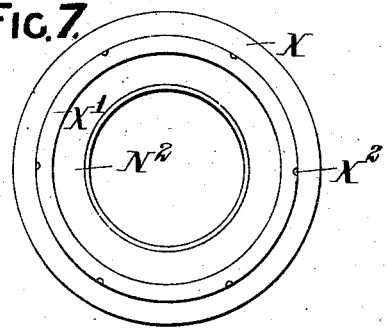
Witnesses
Inventor
James Abbott No. 850,611. PATENTED APR. 16, 1907.
J. ABBOTT.
MACHINE FOR CUTTING OR SHEARING METAL SHEETS OR PLATES.
APPLICATION FILED MAY 10, 1904.
3 SHEETS—SHEET 3.
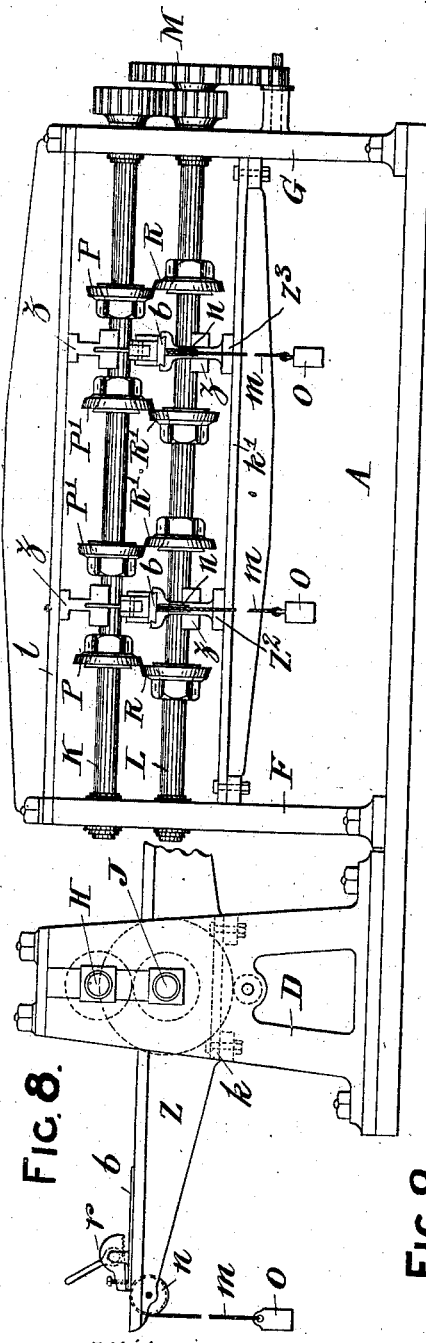
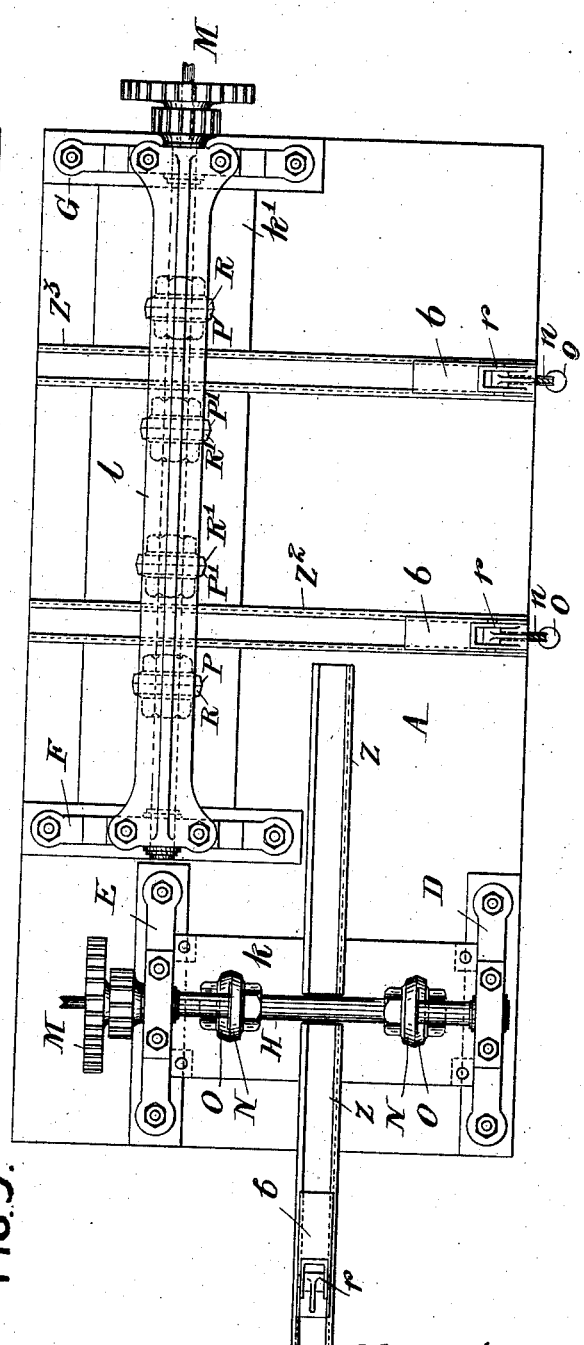
Witnesses
Wm. Kuhne
John A. Percival.
Inventor
James Abbott
By Richardson
ATTORNEYS

UNITED STATES PATENT OFFICE.

JAMES ABBOTT, OF NEWPORT, ENGLAND.

MACHINE FOR CUTTING OR SHEARING METAL SHEETS OR PLATES.

No. 850,611.

Specification of Letters Patent.

Patented April 16, 1907.

Application filed May 10, 1904. Serial No. 207,316.

*To all whom it may concern:*

Be it known that I, JAMES ABBOTT, a subject of His Majesty the King of Great Britain, and a resident of Daleside, 70 Caerau road, Newport, in Monmouthshire, England, have invented certain new and useful Improvements in Machines for Cutting or Shearing Metal Sheets or Plates for which I have made application for patent in Great Britain, No. 22,867, dated October 22, 1903, and of which the following is a specification.

My invention has reference to improvements in and in connection with the method and means hitherto employed for cutting or shearing metal sheets or plates, and comprises a new or improved machine therefor having for its objects to cut or shear up tin, copper, iron, steel, or other metal sheets or plates in a more expeditious, efficient, and cheaper manner than has been possible hitherto, thus saving both time and labor and greatly increasing the output of work as compared with the present usual method of shearing or cutting by hand, which besides being exceedingly costly is more or less unsatisfactory generally.

Referring to the accompanying drawings, Figure 1 is a side elevation of one form of apparatus constructed in accordance with my invention. Fig. 2 is a plan view of Fig. 1. Fig. 3 is an enlarged side elevation looking from right to left of Fig. 1. Fig. 4 is a sectional side elevation of one of the circular knives or cutters, illustrating how the same may be mounted upon its shaft or spindle. Fig. 5 is a side elevation viewed from left to right of Fig. 4. Figs. 6 and 7 are respectively central sectional and front elevations of a modified form of cutter. Figs. 8 and 9 are respectively front and plan view of a similar but modified form of machine to that illustrated by Figs. 1, 2, and 3.

In carrying my invention into effect I construct a suitable bed-plate, base, or the like A, which may be mounted in any convenient manner upon a frame, table, or other suitable support, and on such base or bed plate A, or, if desired, any other foundation, are bolted or otherwise connected thereto a pair of base-plates or frames, such as B C, preferably disposed at right angles to each other and arranged at a convenient distance apart in the manner suggested by Figs. 1 and 2. To each of such base-plates or frames B C are bolted, riveted, or otherwise suitably rigidly connected one of a pair of vertical standards or supports D E and F G, respectively, between each of which pairs of standards or the like and adapted to be suitably borne thereby are situated a pair of rods or shafts H J and K L, each pair of such rods or shafts being for preference disposed one immediately above the other and having their one ends thereof projecting beyond the vertical standards D G, respectively, for the purpose of being arranged in connection with any suitable gearing, such as M, adapted in the usual well-known manner for conveying motion to the said shafts or spindles from any convenient or available source of power. Upon each of the said rods or shafts H, J, K, and L are mounted a pair of circular knives or cutters N N, O O, P P, and R R, respectively, which said knives or cutters are preferably tightly fixed upon the said rods or shafts above referred to by mounting a parallel threaded and partly-split liner T' upon the shaft, upon which liner are screwed a pair of split nuts V V', provided with recessed tapered surfaces W W', adapted to engage with each side, respectively, of the double tapered inner surface of a knife or cutter, such as N', and when screwed toward the latter operate to cause the liner T' to grip, and thereby retain, such knife or cutter upon its rod or shaft, owing to the threads of the lock-nuts imparting pressure upon the thread of the liner in the direction of the arrows, as illustrated by Fig. 4.

The knives or cutters N O, &c., may either be arranged with the cutting edges formed directly by the outer periphery of same, as shown by Fig. 4, or such cutting edges may for convenience of renewal be formed separate, as illustrated by Figs. 6 and 7, wherein a separate ring X, comprising the cutting edge, is fixed on a cutter-block, such as N², by a threaded ring X', screwed onto the cutter-block N² and having its outer diameter tapered, so as to wedge the cutting-ring X tight to the block. Grooves or recesses X² are provided in the threaded ring X' for permitting a spanner to engage therewith for tightening same. Obviously the threaded rings X' would have to be, respectively, right and left threaded for the top and bottom cutters to keep these from unscrewing when cutting, while the same means herein referred to are clearly applicable for fixing same on the shaft.

Conveniently arranged at right angles or thereabout to the said base-plate B and the rods or shafts respectively borne by the standards connected thereto, as herein stated, are centrally provided a pair of suitable guides or like supports Z Z, bolted to and arranged upon either side of the base-plate B in a direct line with each other, substantially as shown by Figs. 1, 2, and 3, and having formed in the upper surface thereof a dovetail or other-shaped groove or recess $a$, adapted to receive a suitable clip comprising a slide $b$, between the walls $c$ of which an inclined piece $d$ is arranged to move beneath a pin $e$, such inclined piece when drawn back permitting a sheet or plate $f$ to be placed therebeneath upon the guide or support Z, as suggested by dotted outline in Fig. 2, and be held and retained thereon on a forward movement of $d$, which causes this to grip the sheet or plate $f$, owing to the inclined upper surface of $d$ bearing against the pin $e$, a suitable stop $g$ being provided at a convenient part of the guide or support Z Z for impinging against the forward end of the slide $d$ and permitting the said sheet or plate to be automatically released therefrom at the moment the cutting operation is completed, as hereinafter described. In a like manner the base-plate C is provided with similar guides or supports; but as this portion of the apparatus is designed to treat the length of the sheets a pair of guides or support Z' Z' would preferably be arranged at each side of the base-plate, substantially as shown in Fig. 2, and, if desired, in lieu of providing a clip or slide for each groove $a'$ in the said guides or supports a suitable traveling plate or like support $h$, having dovetail webs $i$ upon its under surface for engaging with such recesses or grooves $a'$, may be provided, in which case one central clip $j$, similar to that described with reference to the guides or supports Z Z, may be employed, although two or more may be used, if desired.

An arrangement of guides and traveling plate similar to Z' Z' and $h$ may be provided upon the base-plate B in lieu of the arrangement shown.

The before-mentioned circular knives or cutters are arranged upon the said rods or shafts for use in pairs, two knives or cutters being mounted upon each shaft and each knife or cutter upon the one shaft being so arranged with relation to the knife or cutter upon the other that their cutting-faces are opposite to and in close proximity to each other, as will be clearly understood by reference, for an example, to the knives or cutters P P upon the upper shaft K and R R on L, the distance between each pair of cutters P R of K L and N O of H J being regulated in the manner hereinbefore described, according to the size of the sheets or plates to be cut.

In practice, having adjusted the four pairs of cutters to their correct position, the sheet or plate $f$ (shown in dotted outline in Fig. 2) would in some cases be first placed upon the guide or support Z, clipped beneath the inclined piece $d$, and be fed forward by the operator to the knives or cutters N O N O, which, receiving motion through the gearing M, would cut or shear off the edges of the width of said sheet or plate and automatically feed the same forward during such cutting or shearing operation until the forward end of the slide $b$ impinged against the stop $g$ in the recess $a$ of Z, whereat the clip being stopped from further motion the sheet or plate is forced out therefrom at the moment when the cutting or shearing operation at this point is completed. An attendant ready to receive such sheet or plate would remove same from the guide Z and transfer and clip it lengthwise upon the table or plate $h$, whereupon the said traveling plate or table $h$ would be similarly fed forward until the two pairs of cutters or knives P R commence to cut or shear the ends of such sheet or plate $f$ and, as before, operate to automatically feed forward and release the same at the finish of the operation, such automatic release of the plate being in this case attained by arranging the forward end of the inclined part of the clip $j$ to impinge against the rod or shaft K. In this manner by two operations only of one machine both the ends and sides of the sheets or plates may be quickly and easily cut or sheared off with a minimum of time and labor as compared with the methods and means hitherto employed for this purpose, and although I have described cutting the sides of the plates first and the ends after it will be obvious that (and in some cases it may be desirable) the ends may be cut off first with or without arranging the machine especially for this purpose.

The slide $b$ of the clip device and the traveling table or plate $h$ may, if desired, be provided with balance-weights or like means for automatically returning said retaining and supporting devices to their original position at the finish of the cutting or shearing operation, as suggested in Figs. 8 and 9 and hereinafter referred to.

As a slight modification of my invention as so far described and for the purposes of permitting two or more cutting operations simultaneously, I may provide a plurality of pairs of such knives or cutters herein described upon each pair of rods or shafts; but, for the sake of example and referring to Figs. 8 and 9, an arrangement of knives or cutters is illustrated whereby one sheet or plate may be simultaneously trimmed and cut into three separate sheets or plates or two separate sheets or plates may be simultaneously trimmed in the manner before stated. With the exception that the base-plates B C are dispensed with and cross supporting plates or platforms k k' are substituted therefor and the vertical standards or supports may be additionally supported by a cross-bar l the machine represented by Figs. 8 and 9 is to all intents and purposes substantially the same as that shown by Figs. 1, 2, and 3, which latter may, if so desired, be similarly arranged to Figs. 8 and 9, or vice versa. Therefore in both constructions like parts are referred to by similar reference-letters. The arrangement of the pairs of cutters N O being the same as before described, this part of the cutting or shearing operation need not be again referred to; but upon the shafts or rods K L are respectively provided a second pair of cutters P' and R', arranged with relation to each other similar to the cutters P and R, the cutting edges of each pair being (for example) shown equidistant apart. Duplicate recessed guides or supports $Z^2$ $Z^3$ are provided, each one of which is preferably situated, as shown, between each double set of knives or cutters P R P' R' for conjointly supporting and retaining the sheet or plate lengthwise thereon, which latter when fed between the revolving cutters is trimmed and cut thereby into three separate sheets or plates simultaneously. For permitting the slides b and retaining devices thereon to be returned to their original position automatically after each operation a cord or the like m may be attached at one end to each of said slides and passed over a suitable pulley n, borne by the before-mentioned guides Z $Z^2$ $Z^3$ and connected at its opposite end to a suitable balance-weight O, as shown in Fig. 8.

As shown in Fig. 8, additional bearings or thrust-blocks, such as z, may be suitably disposed and arranged upon the frame of the machine for preventing undue strain of the rods or shafts.

If desired, live rollers may be suitably provided, in any well-known manner, upon one guide or guides for automatically feeding the sheet or plate onto or up to the second guide or guides.

Having now described my invention, what I claim as new, and desire to secure by Letters Patent, is—

1. A machine for cutting or shearing metal sheets or plates comprising a suitably-mounted base or bed having a pair of base-plates attached thereto at right angles to each other, each of said base-plates supporting a pair of standards or supports, between which and borne thereby are arranged a pair of shafts situated one above the other and having circular knives or cutters adjustably mounted thereon, with means for rotating said knives or cutters and supporting and retaining the metal sheets or plates in position during the cutting or shearing operations, substantially as herein described and shown.

2. A machine for cutting or shearing up metal sheets or plates in two operations, comprising a suitably-mounted base or bed, having base-plates attached thereto at right angles to each other, one of said base-plates supporting a pair of standards between which and borne thereby are arranged a pair of shafts situated one above the other, and connected by suitable gearing, and each having a pair of knives or cutters adjustably mounted thereon in suitable relation, one of said base-plates similarly supporting at right angles to the standards before mentioned a pair of standards forming bearings for a pair of shafts arranged in like manner to the shafts carried by the other base-plate, and each having a pair of knives or cutters adjustably mounted thereon in suitable relation, each of said base-plates having connected thereto one or more pairs of guides or supports provided with traveling and retaining means for supporting and retaining the sheets or plates in position during the cutting or shearing operation, substantially as, and in the manner herein described and shown.

3. A machine for cutting or shearing up metal sheets or plates in two operations, comprising a suitably-mounted base or bed A having duplicate pairs of standards or supports D E and F G directly attached thereto at right angles to each other, and respectively forming bearings for shafts H J and K L connected to suitable gearing, the former pair of shafts H J having respectively a pair of circular knives or cutters N N, O O, adjustably mounted thereon in suitable relation, and the latter pair of shafts K L, having respectively a plurality of pairs of circular knives or cutters P R and P' R' adjustably mounted thereon in suitable relation, each said pairs of standards being provided with cross supporting plates or platforms k k' respectively, upon each of which may be connected one or more pairs of guides or supports Z Z or $Z^2$ $Z^3$ provided with traveling and retaining means for supporting and retaining the sheets or plates in position during the cutting or shearing operations, the whole connected, combined, and operating substantially as and for the purposes herein described and shown.

4. In the improved means for cutting or shearing metal sheets or plates, the combination therewith of means for adjustably mounting the circular knives or cutters upon their respective shafts, consisting of a partly-split parallel liner T' externally threaded and adapted to receive a pair of split lock-nuts V V' for tightly retaining a knife or cutter N' upon a rod or shaft, substantially as and in the manner herein described and shown.

5. In the improved means herein set forth for cutting or shearing metal sheets or plates, the combination therewith of a circular knife or cutter consisting of a cutter-block having a renewable cutting-ring and a threaded ring having its outer diameter tapered, said threaded ring being adapted when screwed onto said cutter-block to wedge said cutting-ring tight to the block and when unscrewed to permit said cutting-ring to be quickly and easily removed and replaced by a new one substantially as described and shown.

In testimony whereof I have hereunto set my hand in presence of two witnesses.

JAMES ABBOTT.

Witnesses:
HENRY CONRAD HEIDE,
ALBERT GEORGE BARNES.